July 30, 1968   L. R. WESTBY ET AL   3,394,595
SPEED SENSING DEVICE

Filed May 3, 1967                           2 Sheets-Sheet 1

INVENTORS
Lloyd R. Westby
Francis H. Bourgeois
BY
ATTORNEYS

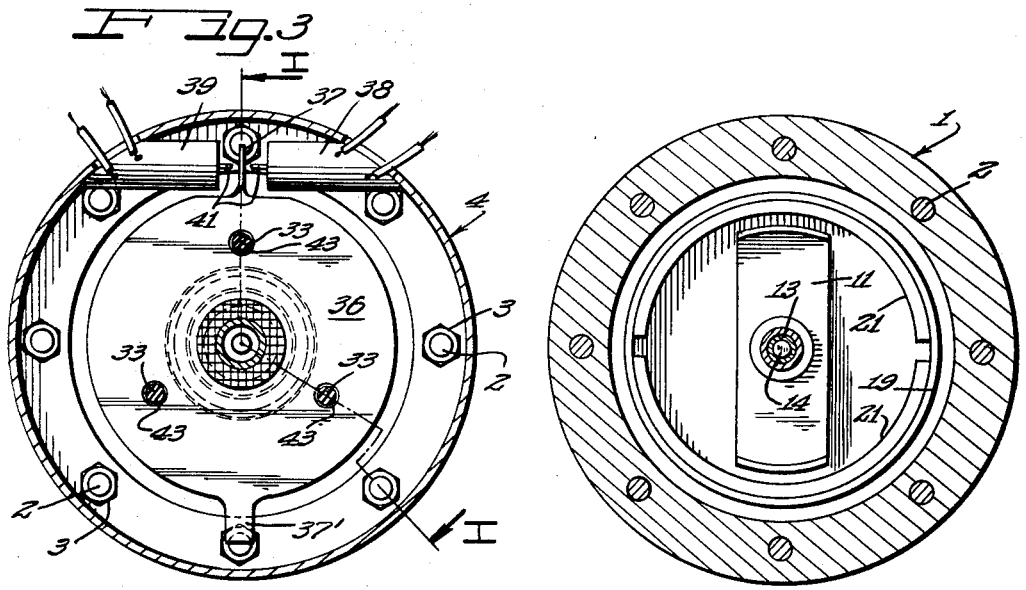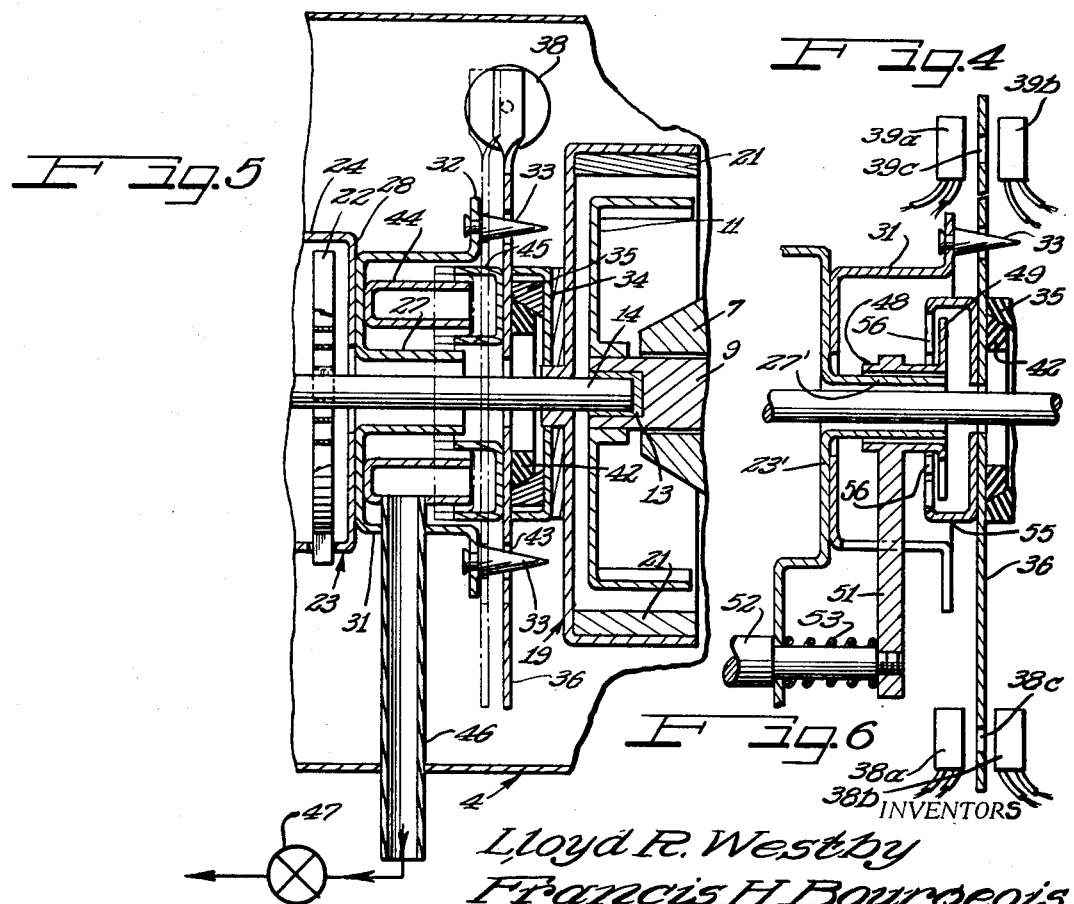

United States Patent Office 3,394,595
Patented July 30, 1968

3,394,595
SPEED SENSING DEVICE
Lloyd R. Westby, P.O. Box 233, Wayne, Ill. 60184, and Francis H. Bourgeois, P.O. Box 84, Oak Park, Ill. 60305
Filed May 3, 1967, Ser. No. 635,882
15 Claims. (Cl. 73—518)

ABSTRACT OF THE DISCLOSURE

A sensing device for rotating elements, having a spring biased magnetically coupled driven element which is positionally responsive to the r.p.m. of a rotating driving element, a sensing element detachably carried by said driven element, electromagnetic, pneumatic, or manual means being illustrated for effecting selective detachment of such sensing element, and means, for example, switches or light responsive means, cooperable with said sensing element and operable thereby.

---

The invention is directed generally to sensing devices, and more particularly to a device for sensing speed or movement of a mechanism to be controlled.

The invention is of particular advantage in connection with the sensing of velocity or speed, for example, of a vehicle or a rotating element, such as the armature of a motor or the like. The invention is disclosed in connection with a structure which is particularly suitable for sensing the rate of rotation of a rotating member and thus may be incorporated in a vehicle for sensing the speed thereof as determined, for example, by the transmitting mechanism of the same type as that employed in connection with a vehicle speedometer, and if desired may be associated therewith. However, the invention also may be utilized in connection with mechanisms involving other than a rotative movement.

The invention has among its objects the production of a sensing device which is so designed that it has a minimum inertia and thus introduces substantially no drag in the operating mechanism, resulting in a minimum operating differential, instant response, and maximum sensitivity.

Another object of the invention is the production of such a sensing device which is readily adjustable over a wide operating range and may be readily designed for electrical, mechanical or vacuum actuation and thus may be readily adapted for remote control adjustment.

A further object of the invention is the production of such a sensing device which is extremely simple in construction, inexpensive to manufacture and is substantially foolproof in operation.

Many other objects and advantages of the construction herein shown and described will be apparent to those skilled in the art from the disclosure herein given.

In the drawings, wherein like reference characters indicate like or corresponding parts:

FIG. 3 is a transverse sectional view taken approximately on the line III—III of FIG. 1;

FIG. 4 is a sectional view taken approximately on the line IV—IV of FIG. 1;

FIG. 5 is a fragmentary sectional view similar to FIG. 1 illustrating an adjusting mechanism which is actuated by vacuum means; and FIG. 6 is a fragmentary sectional view similar to FIGS. 1 and 5 of an adjustment mechanism which may be mechanically actuated, for example, manually, and which utilizes light responsive means.

Figure 1:
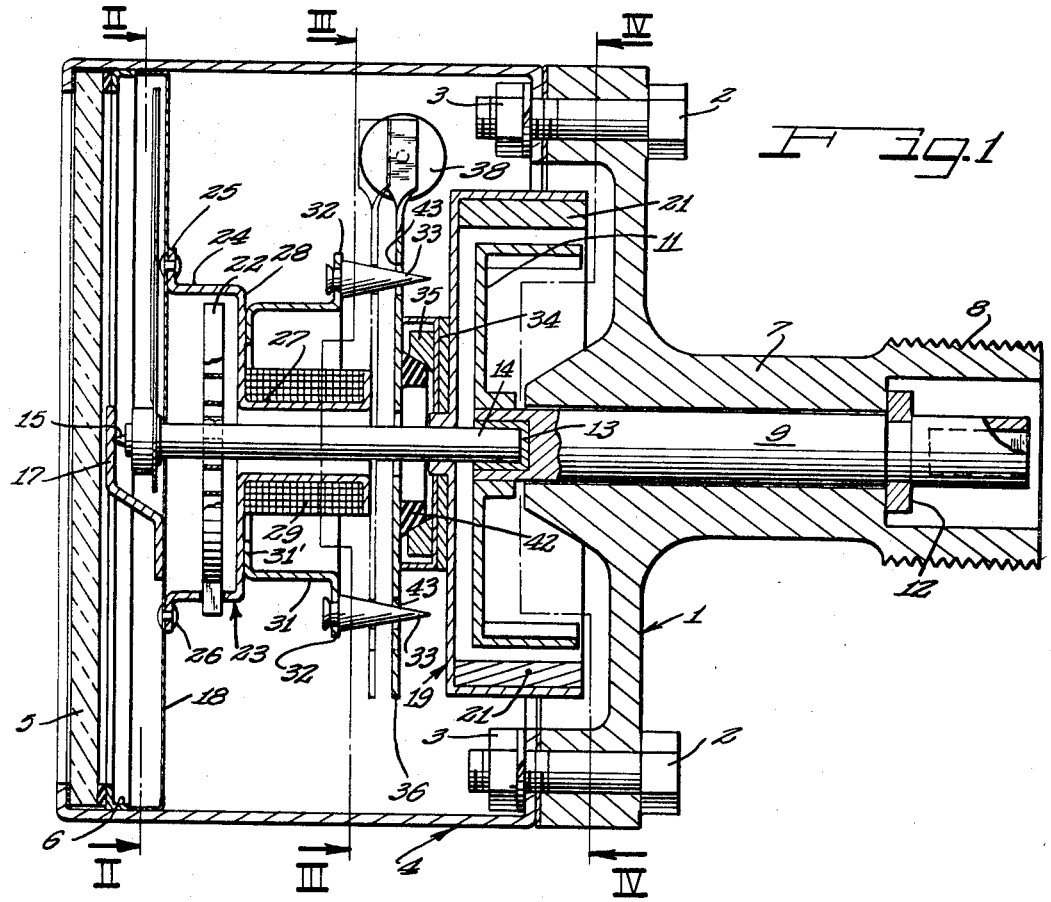
FIG. 1 is a longitudinal sectional view of a sensing device embodying the invention, utilizing electromagnetic adjustment, taken approximately on the line I—I of FIG. 3.
Figure 2:
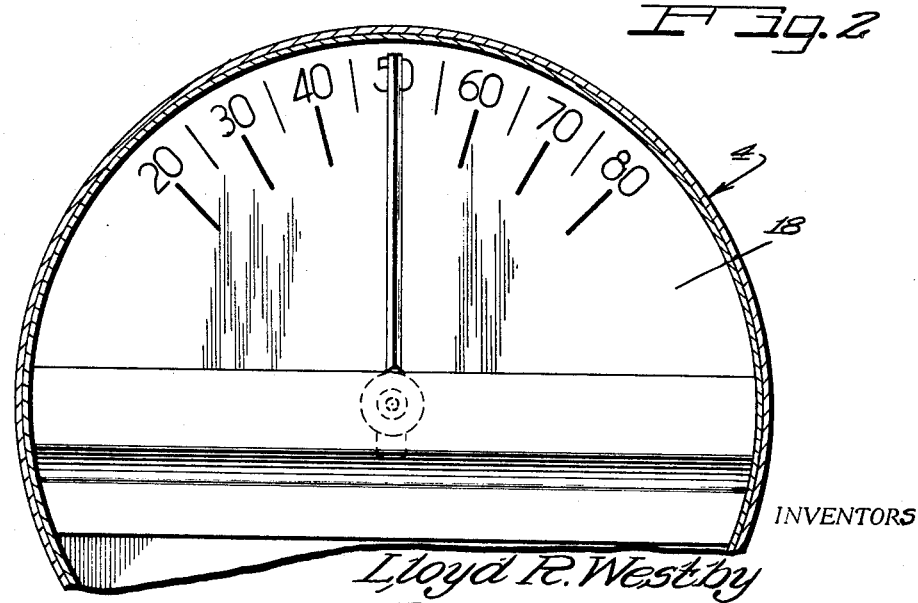
FIG. 2 is a transverse sectional view taken approximately on the line II—II of FIG. 1.

The invention generally contemplates a sensing device having a driven element which has an operative travel proportional to the operating range of the mechanism or system to be controlled, which is provided with an actuating element which may be releasably connected therewith and thus may be operatively disposed relative thereto in various operating relationships, depending upon the point along the operational course of the device at which the sensing is to take place. Thus, the sensing element may be operatively disposed for actuation at any point along the operational course of the mechanism involved. The construction is such that the adjustment may be controlled by electromagnetic means, vacuum actuated means or mechanical means, depending upon the particular application involved. Also associated with the sensing element is indicating means through which the adjustment setting of the device may be readily ascertained.

Referring to the drawings, and more particularly to FIGS. 1 through 4, the sensing unit therein illustrated is enclosed in a housing comprising a base or backing body member indicated generally by the numeral 1 to which is secured by suitable means, such as bolts 2 and nuts 3, a cover member indicated generally by the numeral 4, of generally cylindrical shape and closed at its free end by a glass lens 5 which is retained in place by a flanged ring 6 with the glass preferably being enclosed between respective gasket rings.

The base member 1 is provided with an axially extending bearing sleeve 7 terminating at its free end in a threaded boss 8, in which bearing is supported a rotatable input shaft 9, the latter having a paramagnetic armature 11 secured to its inner end and rotatable therewith, the outer end of the shaft 9 being suitably constructed for engagement with driving means, as for example, a square bore in its outer end adapted to receive a mating rotating member. Axial movement in an outward direction is prevented by the hub portion of the armature 11 and inward movement by a snap ring 12 seated in a cooperable peripheral groove in the shaft 9. The inner end of the shaft 9 is provided with a bore in which is seated a pilot bearing 13 in which the adjacent end of an output shaft 14 is rotatably carried, with the opposite end of the shaft 14 having a needle point bearing 15 seated in a mating recess in a bearing plate 17 suitably mounted on the dial plate 18.

Mounted on the inner end of the shaft 14 and rotatable therewith is a cup-shaped field assembly which includes a generally cup-shaped member 19, having a pair of arcuate-shaped magnets 21 disposed around the inner surface of its peripheral flange, which are cooperable with the armature 11 to effect a transmittal of torque from the input shaft 9 to the output shaft 14, the torque so transmitted being opposed by a torsion spring 22 which may be formed from flat strip spring stock and has its inner end attached to the shaft 14 and its outer end anchored to a generally cylindrical or tubular-shaped member 23 having a portion 24 of relatively large diameter. The outer edge of the member 23 is provided with an outwardly extending flange 25 which is secured to the dial plate 18 by suitable means such as rivets 26. The member 23 also is provided with a portion 27 of relatively small diameter which is connected to the portion 24 by a generally radially extending connecting portion 28, with the extreme inner edge of the portion 27 being provided with an outwardly extending flange, which with the face 28 forms a spool for an electromagnet winding 29.

Also secured to the member 23 is a generally annularly-shaped member 31 having an inwardly directed flange 31 secured to the wall 28 of the member 23 and provided at its opposite edge with a plurality, for example three, tabs 32 which form supporting means for respective conical-shaped pins 33.

Also mounted upon the member 19 and rotatable therewith is a flanged disc 34 in which is disposed an annularly-shaped permanent magnet 35, the latter having an outwardly diverging conical inner face. Cooperable with the member 34 and magnet 35 is a circular shuttle disc 36 which is provided at the upper portion thereof, as viewed in FIG. 3, with an actuating tab 37 which is counterbalanced by a downwardly extending projection 37' diametrically disposed with respect thereto, the tab 37 being cooperable with respective switches 38 and 39 having actuating pins 41 adapted to be engaged by the tab 37 during the operation of the device. As illustrated in FIG. 1, the disc 36 is provided with an annularly-shaped rubber ring 42 having an outer peripheral surface which is conical-shaped and complemental to the adjacent conical face of the magnet 35. As illustrated, the tapered pins 33 extend through cooperable openings 43 in the disc 36.

It will be apparent that the armature 11 and field member 19, together with magnets 21, form a torque transmitting unit, similar to that of a vehicle speedometer unit, and upon rotation of the input shaft 9, the output shaft 14, in absence of the connection of the shuttle disc 36 therewith, will be rotated to a position where the transmitted torque from the shaft 9 is balanced by the action of the torsion spring 22, the shaft 14 moving through a greater or lesser arc depending upon the rate of rotation of the shaft 9. This, for example, would be the case if the magnet windings 29 were suitably energized, thereby attracting the shuttle disc 36 thereto to the approximate position illustrated in broken lines in FIG. 1. Obviously, as the openings 43 in the disc through which the pins 33 extend are of approximately the same diameter as the cone in the plane of the allocated disc, such attraction of the disc will also result in a centering by the conical surfaces of the pins 33 acting on the disk. Upon deenergization of the winding 29 the disc 36 will be drawn to the magnet 35 and retained thereby in such position, the ring 42 of rubber or other resilient material serving the double function of centering the disc with respect to the magnet and the shaft 14 on which it is carried, as well as providing a frictional engagement therewith to prevent relative rotation of the disc 36 with respect to the shaft 14 other than when the disc is disengaged therefrom by the action of the winding 29.

Referring to FIG. 3, it will be apparent that when the shuttle disc 36 is in the position illustrated, neither of the switches 38 or 39 will be actuated, but as the rate of rotation of the shaft 9 decreases or increases from speed required to maintain the shuttle disc in the position illustrated in FIG. 3, the disc will tend to rotate in the corresponding direction, either responsive to increased torque action from the higher rotative speed of the shaft 9 or to the action of the spring 22 as the speed of the shaft 9 decreases, resulting in a decreased torque applied to the shaft 14, whereby the appropriate switch will be actuated to effect a desired control. It will be apparent that by disconnecting the shuttle disc from the shaft assembly, by actuation of the winding 29, the shaft 14 may be brought into any desired position by suitable rotation of the shaft 9, following which the winding 29 may be deenergized whereby the tab 37 carried by the disc 36 will be disposed between the two switch actuating pins 41, remaining in such position as long as the shaft 9 continues to rotate at the given speed. However, upon a change in speed of the shaft 9, the corresponding switch will be actuated. The determination of the proper speed may, for example, be readily ascertained by visual examination of the position of the indicating needle carried by the outer end of the shaft 14.

The construction illustrated in FIG. 5 is generally similar to that illustrated in FIG. 1, with the exception that the actuation of the shuttle disc 36 to a disengaged position with respect to the magnet 35 is effected by vacuum operated means instead of electromagnetic means as illustrated in FIG. 1. In this construction, two nesting annular-shaped members 44 and 45 take the place of the winding 29, the member 44 being rigidly secured to the member 23 and the member 45 being rigidly secured to the disc 36. Operatively connected to the interior of the member 44 is an air discharge pipe 46 which is adapted to be connected through a suitable valve 47, schematically illustrated, whereby upon opening of the valve 47, for example, manually, air is withdrawn through the tube 46, operative to draw the member 45 and thus the disc 36 into the position illustrated in dotted lines in FIG. 5 and thereby operatively disengage the disc from the shaft 14. Upon closure of the valve 47 the disc will be returned to the position illustrated in FIG. 5 by the attraction exerted by the magnet 35.

In some cases it may be desirable to effect a mechanical adjustment of the disc 38 instead of through electromagnetic or vacuum operated means and such construction is illustrated in FIG. 6, wherein the member 23' is provided with a tubular portion 27' of relatively small diameter upon which is slidably disposed a tubular member 48, having an interrupted flange 49 thereon, the member 48 being rigidly connected by an arm 51 with an axially movable shaft 52, adapted to extend to the front exterior of the device and provided with a suitable knob by means of which it may be manually drawn outwardly. Such movement is opposed by a compression spring 53, encircling the shaft 52, thus biasing the shaft and the member 48 in an inward direction, which movement is limited by suitable means such as a shoulder on the shaft 52. Mounted on the shuttle disc 36 is an annular member 55 having radially inwardly extending projections 56, for example, three such projections thereon, engageable with the uninterrupted portions of the flange 49, whereby the shuttle disc may be operatively disconnected from the member 19, in a manner corresponding to that described for the constructions of FIGS. 1 and 5, upon outward movement of the shaft 52 and with it the member 48. The interruptions on the flange 49 enable the assembly of the members 48 and 55 without difficulty.

FIG. 6 also illustrates the use of photocells 38a, 39a and lamps 38b, 39b in place of the switches 38 and 39, the shuttle disc having respective arcuate openings 38c and 39c therein which are so disposed with respect to their associated lamp and cell that when the shuttle disc is in a centered position, representing normal desired operating conditions, opaque portion of the shuttle disc are interposed between each lamp and cell. If the speed of the controlled device increases the opening 38c will be disposed between the cells 38a and lamp 38b, resulting in a current flow in the circuit associated with such cell, which may be utilized, for example, to actuate a relay. Likewise, if the speed of the controlled device decreases, the cell 39a will be actuated.

Obviously, the constructions of FIGS. 1 and 5 provide an arrangement which may be readily operated by remote control means, either electrically in the case of FIG. 1, or pneumatically as in the case of FIG. 5. As the structure associated with the output shaft 14 may be very lightly constructed, the mass of the sensing structure comprising the disc 36 and cooperable elements possess a minimum of inertia, resulting in a highly sensitive device.

It will also be noted that the invention may be employed with mechanism other than those involving rotating elements to be sensed, the driven member in such case being so connected to the corresponding movable element of the mechanism involved that the movement of the driven member is representative of the function or characteristic to be sensed.

Having thus described our invention, it will be obvious from the disclosure herein given that various immaterial modifications may be made in the same without departing from the spirit of the invention; hence we do not wish to be understood as limiting ourselves to the exact form, construction, arrangement and combination of parts herein shown and described or uses mentioned.

We claim:

1. In a sensing device for a movable mechanism, the combination of a movable driven member, means for operatively connecting said member to the movable mechanism involved whereby the position of said driven member is representative of the operational characteristic being sensed, a sensing element, sensing means responsive to the position of said sensing element forming the output means of said device, means releasably connecting said sensing element to said driven member for operative movement therewith in different relationships, and means for selectively disconnecting said sensing element from said driven member and selectively connecting the same whereby said sensing element may be connected to the driven member in a relationship which differs from that which existed prior to disconnection.

2. A sensing device according to claim 1, wherein said device is constructed for use with a rotating mechanism, said connecting means comprising a rotatable driving member and means operatively connecting said driving member to said driven member for pivotally moving the latter, whereby the pivotal position of said driven member is representative of the rate of rotation of said driving member.

3. A sensing device according to claim 2, wherein said driven member is pivotal about the axis of said driving member, spring means opposing the pivotal movement of said driven member, said sensing element comprising an axially movable shuttle member disposed for limited pivotal movement with respect to said sensing means, said means for connecting said shuttle member to said driven member comprising a magnetic element cooperable with means on said shuttle member for normally fixedly retaining the latter in any selected position with respect to said driven member.

4. A sensing device according to claim 3, comprising in further combination, rotatably fixed means for aligning said shuttle member in a predetermined radial orientation when said shuttle member is disconnected from said driven member.

5. A sensing device according to claim 4, wherein said disconnecting means includes an electromagnetic element operative when energized to attract said shuttle member and draw the same out of engagement with said driven member.

6. A sensing device according to claim 4, wherein said disconnecting means includes a manually actuatable member, moveable in an axial direction and means for transmitting movement of the latter to said shuttle member.

7. A sensing device according to claim 4, wherein said responsive sensing means comprises respective switches, and means on said shuttle member for actuating either one of said switches in dependence upon predetermined movement of said shuttle member.

8. A sensing device according to claim 1, wherein said sensing element comprises a shuttle member disposed for limited movement with respect to said sensing means, said means connecting said shuttle member to said driven member comprising a magnetic element cooperable with means on said shuttle member for normally fixedly retaining the latter in any selected position with respect to said driven member.

9. A sensing device according to claim 8, comprising in further combination fixed means for aligning said shuttle member in a predetermined orientation when said shuttle member is disconnected from said driven member.

10. A sensing device according to claim 8, wherein said disconnecting means includes an electromagnetic element operative when energized to attract said shuttle member and draw the same out of engagement with said driven member.

11. A sensing device according to claim 8, wherein said disconnecting means includes a manually actuatable member, moveable in a shuttle-disconnecting direction, and means for transmitting movement of said manually actuatable member to said shuttle member.

12. In a sensing device for a rotating mechanism, the combination of a movable driven member, means for operatively connecting said member to such a mechanism, comprising a rotatable driving member and means operatively connecting said driving member to said driven member for pivotally moving the latter, whereby the pivotal position of said driven member is representative of the rate of rotation of said driving member said driven member being pivotal about the axis of said driving member, spring means opposing the pivotal movement of said driven member, a sensing element comprising an axially movable shuttle member, sensing means responsive to the position of said shuttle member forming the output means of said device, means releasably connecting said shuttle member to said driven member for operative movement therewith, comprising a magnetic element cooperable with means on said shuttle member for normally fixedly retaining the latter in any selected position with respect to said driven member, and means for selectively disconnecting said shuttle member from said driven member whereby the relationship between said shuttle member and the driven member may be varied, said disconnecting means including an air chamber and a cooperable axially movable member in response to a reduction in air pressure in said chamber, said movable member being connected with said shuttle member for transmitting disconnecting forces thereto, and rotatably fixed means for aligning said shuttle member in a predetermined radial orientation when said shuttle member is disconnected from said driven member.

13. In a sensing device for a rotating mechanism, the combination of a movable driven member, means for operatively connecting said member to such a mechanism, comprising a rotatable driving member and means operatively connecting said driving member to said driven member for pivotally moving the latter, whereby the pivotal position of said driven member is representative of the rate of rotation of said driving member said driven member being pivotal about the axis of said driving member, spring means opposing the pivotal movement of said driven member, a sensing element comprising an axially movable shuttle member, sensing means responsive to the position of said shuttle member forming the output means of said device comprising a pair of light sources and a cooperable light-sensitive cell for each light source, said shuttle member being constructed to cut off the passage of light to both cells when said shuttle member is in its normal operating position, and to permit light to pass to either cell in dependence upon predetermined movement of said shuttle member, means releasably connecting said shuttle member to said driven member for operative movement therewith, comprising a magnetic element cooperable with means on said shuttle member for normally fixedly retaining the latter in any selected position with respect to said driven member, and means for selectively disconnecting said shuttle member from said driven member whereby the relationship between said shuttle member and the driven member may be varied, rotatably fixed means for aligning said shuttle member in a predetermined radial orientation when said shuttle member is disconnected from said driven member.

14. In a sensing device for a rotating mechanism, the combination of a movable driven member, means for operatively connecting said member to such a mechanism, comprising a rotatable driving member and means operatively connecting said driving member to said driven member for pivotally moving the latter, whereby the pivotal position of said driven member is representative of the rate of rotation of said driving member said driven member being pivotal about the axis of said driving member, spring means opposing the pivotal movement of said driven member, a sensing element comprising an axially movable shuttle member, sensing means responsive to the position of said shuttle member forming the output means of said device, means releasably connecting said shuttle member to said driven member for operative movement therewith, comprising a magnetic element cooperable with means on said shuttle member for normally fixedly retaining the latter in any selected position with respect to said driven member and means for selectively disconnecting said shuttle member from said driven member whereby the relationship between said shuttle member and the driven member may be varied, and comprising a plurality of conical-shaped members which extend through respective circular openings in said shuttle member for aligning said shuttle member in a predetermined radial orientation when said shuttle member is disconnected from said driven member.

15. A sensing device according to claim 14, wherein said releasable means connecting said shuttle and driven members comprises a permanent magnet on one of said members operative to draw the shuttle member into engagement with said driven member, and resilient means carried by the other of said members, engageable with said magnet.

References Cited
UNITED STATES PATENTS

| | | | |
|---|---|---|---|
| 1,755,184 | 4/1930 | Martinet | 73—491 XR |
| 2,225,206 | 12/1940 | Cassels | 73—513 XR |
| 3,021,402 | 2/1962 | LaWarre et al. | 73—519 XR |
| 3,044,307 | 7/1962 | Vögtlin et al. | 73—519 |

RICHARD C. QUEISSER, *Primary Examiner.*

J. R. FLANAGAN, *Assistant Examiner.*